US008798884B2

(12) United States Patent
Porto et al.

(10) Patent No.: US 8,798,884 B2
(45) Date of Patent: Aug. 5, 2014

(54) METHOD FOR CLUTCH CONTROL

(75) Inventors: Brian M. Porto, Novi, MI (US); Brian H. Fiore, Waterford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 46 days.

(21) Appl. No.: 13/348,218

(22) Filed: Jan. 11, 2012

(65) Prior Publication Data

US 2012/0265415 A1 Oct. 18, 2012

Related U.S. Application Data

(60) Provisional application No. 61/476,606, filed on Apr. 18, 2011.

(51) Int. Cl.
*F16D 67/02* (2006.01)

(52) U.S. Cl.
USPC ........................................................ 701/67

(58) Field of Classification Search
USPC ........................................................ 701/67
See application file for complete search history.

(56) References Cited

U.S. PATENT DOCUMENTS

| | | | | |
|---|---|---|---|---|
| 6,616,577 | B2 * | 9/2003 | Hayashi | 477/168 |
| 7,338,407 | B2 * | 3/2008 | Long et al. | 477/60 |
| 2004/0152558 | A1 * | 8/2004 | Takami et al. | 477/3 |

FOREIGN PATENT DOCUMENTS

EP 1342930 A2 * 9/2003

* cited by examiner

*Primary Examiner* — Helal A Algahaim
*Assistant Examiner* — Michael Fouche

(57) ABSTRACT

A clutch control process for a motor vehicle transmission during brake lift-out monitors a time rate of change of a brake pedal position and torque to detect a lift-out condition with rapidly changing torque. When the process detects a brake lift-out condition, the process limits the minimum scheduled clutch pressure as well as modifies the clutch pressure to torque relationship.

19 Claims, 3 Drawing Sheets

10
12
14
N
Y
20
22
N
Y
24
16
18

METHOD FOR CLUTCH CONTROL

RELATED APPLICATION

This application claims the benefit of U.S. Provisional Application No. 61/476,606, filed Apr. 18, 2011, the entire contents of which are incorporated herein by reference.

FIELD

The present invention relates to a clutch control strategy for a motor vehicle transmission. More specifically, the present invention relates to a clutch control strategy for a motor vehicle transmission during brake lift-out.

BACKGROUND

The statements in this section merely provide background information related to the present disclosure and may or may not constitute prior art.

In a motor vehicle transmission, closed throttle downshifts can be thought of as an inverted power-on upshift. During such situations, if a lift-out of torque (i.e. a reduction in torque), typical clutch control strategies detect lift-out conditions and modify the control strategy to address the rapidly decreasing torque. The same condition can occur during negative torque regenerative braking closed throttle downshifts when the driver removes pressure from the brake (i.e. brake lift-out) during the clutch control process. Specifically, in particular hybrid arrangements, the coast regenerative torque can vary through the shift process depending on the driver brake input and a desire to maintain constant power to the wheels of the motor vehicle. While braking at high regenerative levels, when the driver lifts out of the brake, it is expected that the level of deceleration returns to a normal level. Thus the torque must be ramped out a predetermined level. Current clutch control strategies, however, are unable to handle situations in which the torque changes rapidly. In particular, current clutch control strategies cannot predict and control the proper clutch pressure to torque relationship.

Accordingly, there is a need for an improved clutch control strategy during brake lift-out.

SUMMARY

A clutch control process for a motor vehicle transmission during brake lift-out monitors a time rate of change of a brake pedal position and torque to detect a lift-out condition with rapidly changing torque. When the process detects a brake lift-out condition, the process limits the minimum scheduled clutch pressure as well as modifies the clutch pressure to torque relationship.

The clutch control process eliminates the possibility of losing control of the transmission's clutch.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. In the drawings.

DETAILED DESCRIPTION

The following description is merely exemplary in nature and is not intended to limit the present disclosure, application, or uses.

Figure 1:
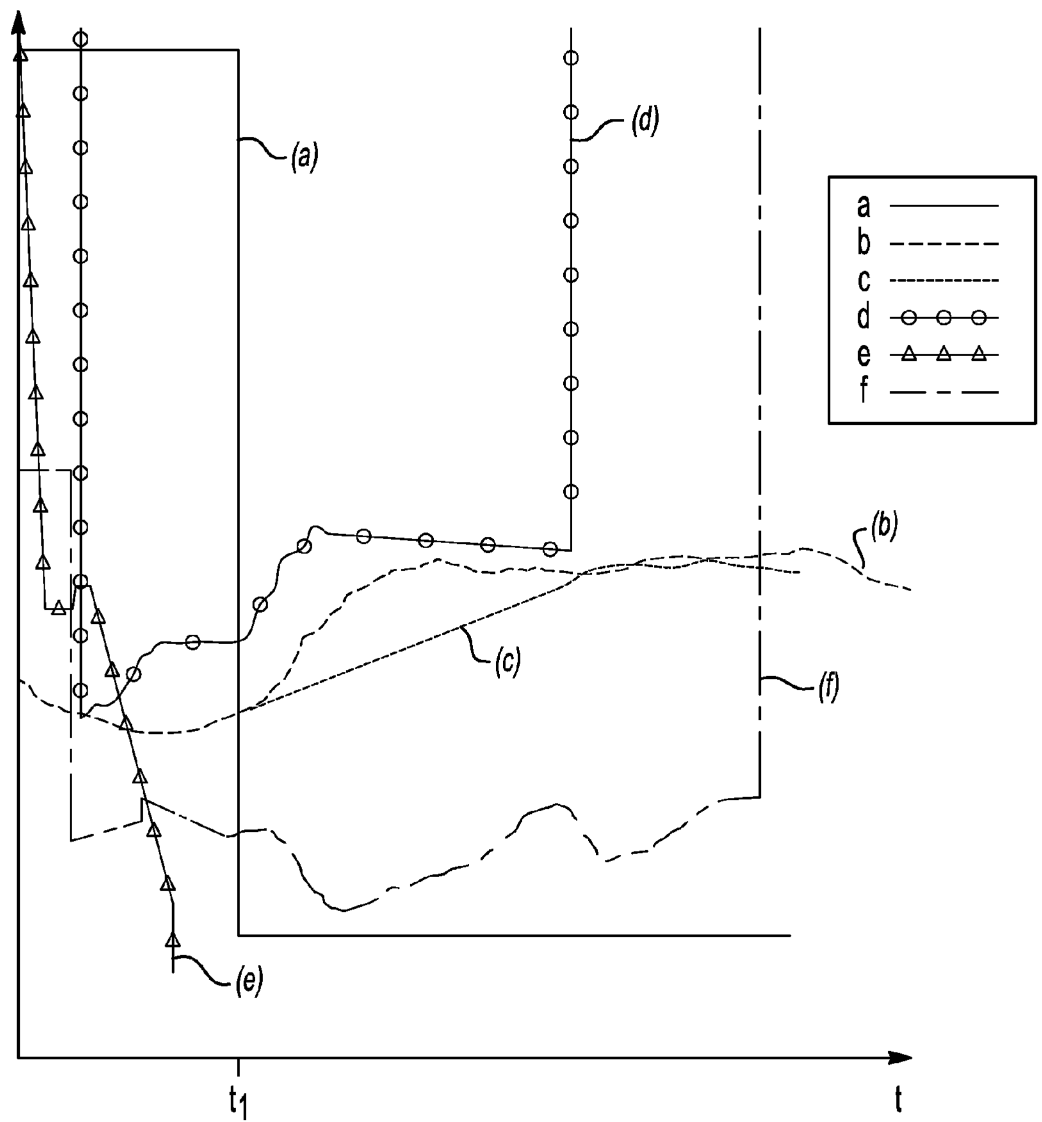
FIG. 1 is a graph of simulation data for uncontrolled command of clutch torque during brake lift-out conditions.
Figure 2:
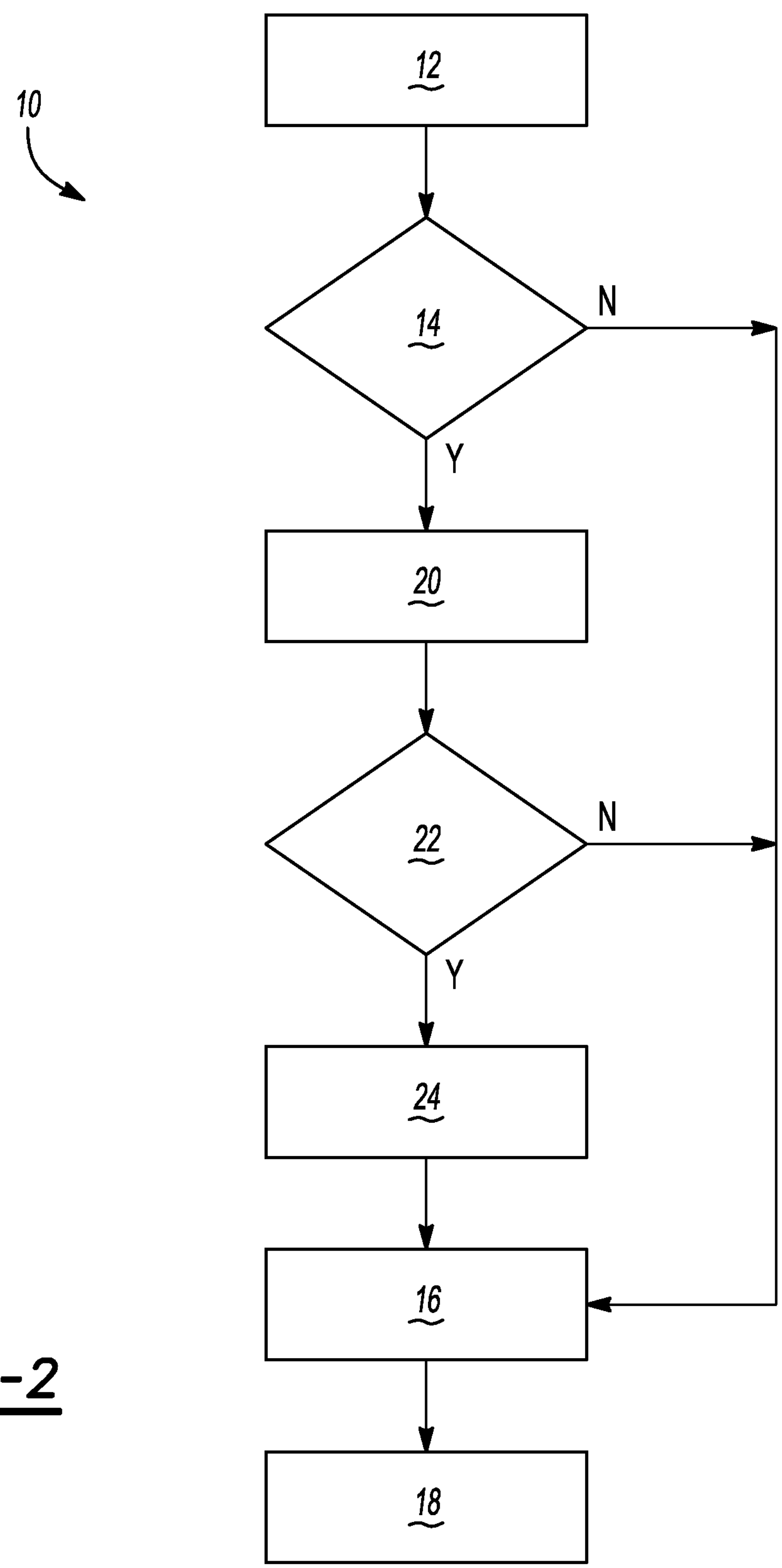
FIG. 2 is a flow diagram for a process to control clutch torque during brake lift-out in accordance with an embodiment of the present invention.

Referring now to the drawings, a process embodying the principles of the present invention is illustrated therein and designated as 10 (FIG. 2). Turning in particular to FIG. 1, a graph of simulation data illustrates conditions that may occur during closed throttle downshifts of a motor vehicle transmission when the driver removes pressure from the brake (i.e. brake lift-out). Specifically, brake lift-out occurs at a time $t_1$, as indicated by a sudden drop in brake pressure (a). When this occurs, there is a rapid rise in the possible torque (b) applied to the transmission's clutch. As such, the possible torque (b) exceeds the target clutch torque value (c), which is the desired torque value for the present conditions. As expected, the clutch torque value (d) is proportional to the possible torque value (b). The rapid rise in the possible torque (b) occurs because of an uncontrolled situation in which the motor vehicle's engine is attempting to return to an idle condition, as indicated by the uncontrolled oncoming command (f) signal to the clutch. That is, in this situation, the change in clutch torque, and hence the change in clutch pressure, results in the rapid change in the possible torque (b).

After the clutch torque changes rapidly, the control device responds in a proportional manner so that the clutch pressure corresponds to the new scheduled clutch torque. The control in this case, however, overshoots the desired value because of the control device's hysteresis, which causes the oncoming clutch engagement to exhaust for a brief period of time. This results in an uncontrolled loss of transmission input speed control.

When the process 10 is implemented, the brake lift-out during downshift conditions becomes controllable. As such, any shift condition that was uncontrollable prior to the use of the process 10 is eliminated by the process 10 so that brake lift-out downshifts become unperceivable to the operator of the motor vehicle.

The process 10 begins with a function call (step 12). Next, the process 10 proceeds to a decision step 14. Here, the process determines (i) if the vehicle is in a coast down situation. (ii) if the position of the accelerator pedal is less than a desired calibrated value for the accelerator position, and (iii) if the features associated with the process 10 are desired. If these three conditions are not met, then the process 10 resets in a step 16 and then ends in a step 18. If the three conditions are satisfied, then the initial position of the vehicle's brake and the initial possible torque are stored in a step 20 as input values for a subsequent calculation.

Next, in a decision step 22, the process 10 determines (i) if the actual brake pedal position is not equal to the initial brake pedal position, (ii) if the difference between the actual clutch torque and the initial clutch torque is greater than or equal to set calibration value, and (iii) if the change in clutch torque divided by a loop time (i.e. the rate of change in clutch torque) is greater than or equal to a set value. If these conditions are not satisfied, then the process 10 proceeds to step 16 where the process 10 resets. The process 10 ends in step 18. If the three conditions in step 22 are satisfied, then the process 10 proceeds to step 24. In step 24, the process 10 sets the scheduled oncoming limit to a calibrated value and sets the coast down clutch pressure to torque gain to a calibrated value for the remainder of the shift. Specifically, the step 24 swaps the actual increasing clutch gain output with a decreasing clutch gain to compensate for the control device's hysteresis associated with the vehicle's transmission during such downshifts.

Figure 3:
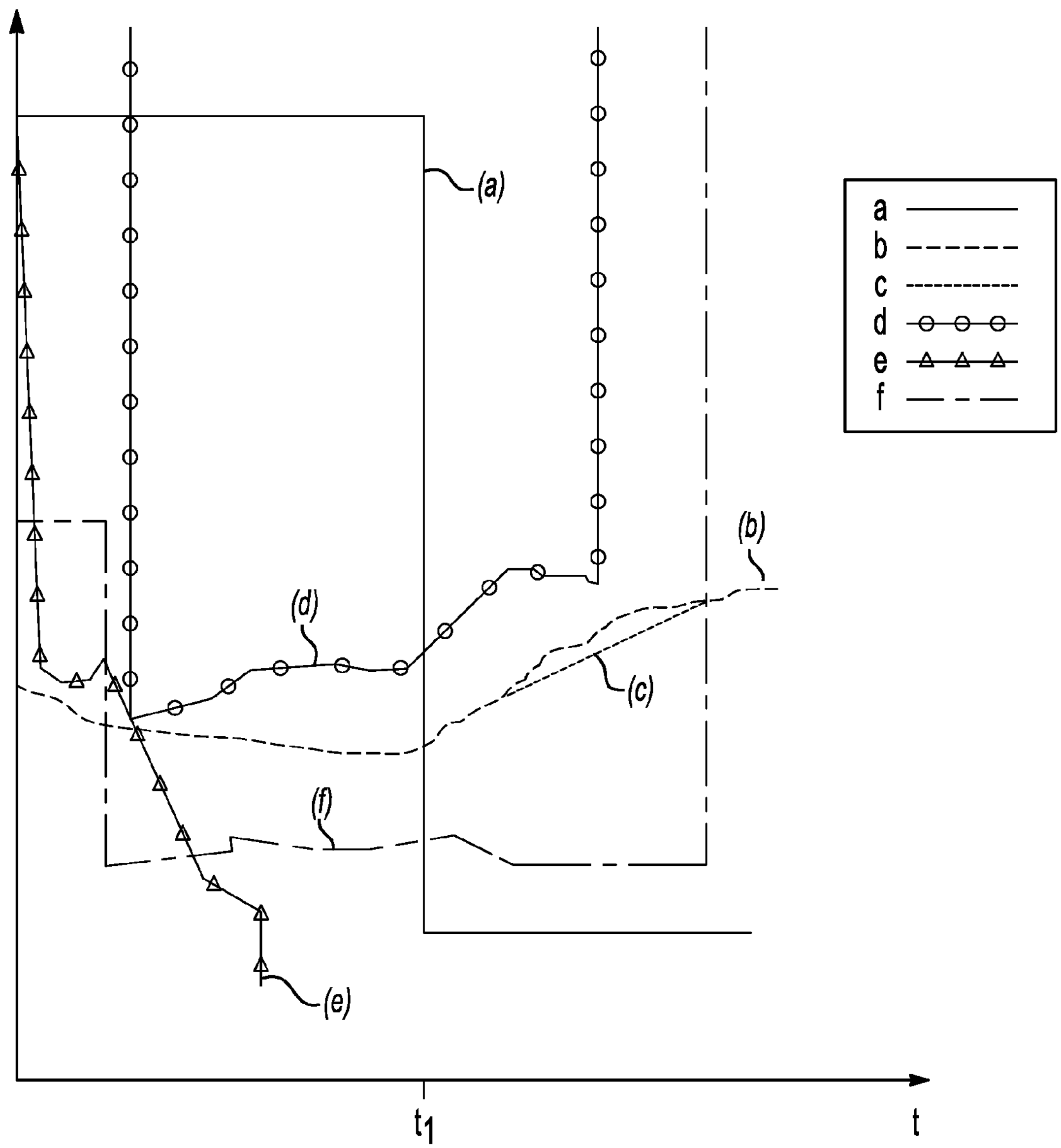
FIG. 3 is a graph of simulation data for controlled command of clutch torque during brake lift-out in accordance with an embodiment of the present invention.

The results of the implementation of the process 10 are illustrated in FIG. 3. After brake lift-out, which occurs at time $t_1$, clutch torque value (d) is attenuated in comparison to the clutch torque value shown in FIG. 1. Also note, that the rise and fall of the uncontrolled oncoming command signal to the clutch shown in FIG. 1 are damped out with the implementation of the process 10, as shown in FIG. 3.

As a result of the implementation of the process 10, when the clutch torque decreases, the control process attempts to decrease the clutch pressure. This pressure to torque relationship is now swapped with a decreasing relationship that allows the control device to decrease the clutch pressure in a controlled manner. In the event of an under-filled clutch, if the controlled pressure drops below a calibrated level, the control pressure gets clipped to that of the calibrated value.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for clutch control of a transmission for a motor vehicle, the method comprising:

determining using a controller, a brake lift-out condition;

limiting a minimum scheduled clutch pressure if a brake lift-out condition is determined; and modifying the clutch pressure to a torque relationship, wherein in an event of an under-filled clutch, the clutch pressure is set to a calibrated valve, and wherein a difference between a possible torque valve and a target torque valve is reduced in comparison to when modifying the clutch pressure to torque relationship is not implemented.

2. The method of claim 1 further comprising determining if the motor vehicle is in a coast situation.

3. The method of claim 2 further comprising determining if an accelerator position is less than a calibrated value for the accelerator position.

4. The method of claim 3 further comprising setting an initial position of the vehicle's brake and an initial possible torque as input values.

5. The method of claim 1 further comprising determining if the actual position of the brake pedal is not equal to the initial position of the brake position.

6. The method of claim 5 further comprising determining if a difference between an actual clutch torque and an initial clutch torque is greater than or equal to a calibration valve.

7. The method of claim 6 further comprising determining if a rate of change in the clutch torque is greater than or equal to a set value.

8. The method of claim 7 further comprising setting a coast clutch pressure to torque gain to a calibrated value.

9. The method of claim 7 further comprising swapping an actual increasing clutch gain out with a decreasing clutch gain.

10. The method of claim 9 further comprising compensating for hysteresis associated with the vehicle's transmission during downshifts.

11. A method for clutch control of a transmission for a motor vehicle, the method comprising:

determining using a controller, a brake lift-out condition;

limiting a minimum scheduled clutch pressure if a brake lift-out condition is determined;

determining if an actual position of the brake pedal is not equal to an initial position of the brake position; and modifying the clutch pressure to a torque relationship, wherein in an event of an under-filled clutch, the clutch pressure is set to a calibrated valve, and wherein a difference between a possible torque valve and a target torque valve is reduced in comparison to when modifying the clutch pressure to torque relationship is not implemented.

12. The method of claim 11 further comprising determining if the motor vehicle is in a coast situation.

13. The method of claim 12 further comprising determining if an accelerator position is less than a calibrated value for the accelerator position.

14. The method of claim 13 further comprising setting an initial position of the vehicle's brake and an initial possible torque as input values.

15. The method of claim 11 further comprising determining if a difference between an actual clutch torque and an initial clutch torque is greater than or equal to a calibration valve.

16. The method of claim 15 further comprising determining if a rate of change in the clutch torque is greater than or equal to a set value.

17. The method of claim 16 further comprising setting a coast clutch pressure to torque gain to a calibrated value.

18. The method of claim 16 further comprising swapping an actual increasing clutch gain out with a decreasing clutch gain.

19. The method of claim 18 further comprising compensating for hysteresis associated with the vehicle's transmission during downshifts.

* * * * *